US009396139B2

(12) United States Patent
Chandler et al.

(10) Patent No.: US 9,396,139 B2
(45) Date of Patent: Jul. 19, 2016

(54) SYSTEM AND METHOD OF CONNECTING A COMPUTER TO A PERIPHERAL OF ANOTHER COMPUTER (71) Applicant: NCR Corporation, Duluth, GA (US)

(72) Inventors: Kevin Chandler, Centerville, OH (US); Jeffrey Longino, Fayetteville, GA (US); Dennis Paisley, Johns Creek, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/506,202

(22) Filed: Oct. 3, 2014

(65) Prior Publication Data
US 2015/0026365 A1 Jan. 22, 2015

Related U.S. Application Data (63) Continuation of application No. 13/628,948, filed on Sep. 27, 2012, now Pat. No. 8,886,842.

(51) Int. Cl.
G06F 3/12 (2006.01)
G06F 13/10 (2006.01)
G06F 3/00 (2006.01)
G06F 13/00 (2006.01)
G06F 17/30 (2006.01)
G06F 12/10 (2016.01)
G06F 9/445 (2006.01)
G06F 3/06 (2006.01)

(52) U.S. Cl.
CPC G06F 13/10 (2013.01); G06F 3/00 (2013.01); G06F 3/1204 (2013.01); G06F 3/1226 (2013.01); G06F 3/1236 (2013.01); G06F 3/1289 (2013.01); G06F 9/44505 (2013.01); G06F 12/10 (2013.01); G06F 13/00 (2013.01); G06F 17/30861 (2013.01)

(58) Field of Classification Search
None
See application file for complete search history.

(56) References Cited

U.S. PATENT DOCUMENTS

2010/0024003 A1 1/2010 Malledant et al.
2010/0161725 A1* 6/2010 Gershom .............. G06F 3/1203
709/203

OTHER PUBLICATIONS

U.S. Appl. No. 13/628,948, Non Final Office Action mailed Jan. 2, 2014, 6 pgs.
U.S. Appl. No. 13/628,948, Response filed Apr. 2, 2014 to Non Final Office Action mailed Jan. 2, 2014, 8 pgs.

* cited by examiner

Primary Examiner — Scott Sun
(74) Attorney, Agent, or Firm — Paul W. Martin (57) ABSTRACT A system and method of connecting a computer to a peripheral of another computer. An example system includes a processor connected to a network and to the one and the other computers through the network. The processor executes web service software which establishes a discovery service for receiving a peripheral connection request from application software of the one computer and peripheral management software which receives information from the other computer through the web service software about the peripherals of the other computer. In addition, the peripheral management software logically associates the peripherals and the other computer with a peripheral station, receives the peripheral connection request from the application software, maps the one computer to a requested peripheral of the peripheral station, and sends information to the application software through the web service software to facilitate connection by the application software to the requested peripheral of the peripheral station through the other computer.

27 Claims, 7 Drawing Sheets

```
49
        12              14           16
<?xml version="1.0" encoding="UTF-8" ?>
- <PeripheralStationManager xmlns:xsi="http://www.w3.org/2001/XMLSchema-instance"
 xsi:noNamespaceSchemaLocation="PeripheralStationManager.xsd" ver="1.0">
- <PosStations>
- <PosStation name="Electronics">
- <Devices>
  <Device peripheralStationId="PeripheralStation1" deviceName="CashDrawer" />
  <Device peripheralStationId="PeripheralStation1" deviceName="Scanner" />
  <Device peripheralStationId="PeripheralStation1" deviceName="Printer" />
  <Device peripheralStationId="PeripheralStation1" deviceName="PinPad" />
  <Device peripheralStationId="PeripheralStation1" deviceName="Micr" />
  </Devices>
  </PosStation>
- <PosStation name="Jewelry">
- <Devices>
  <Device peripheralStationId="PeripheralStation2" deviceName="CashDrawer" />
  <Device peripheralStationId="PeripheralStation2" deviceName="Scanner" />
  <Device peripheralStationId="PeripheralStation2" deviceName="Printer" />
  <Device peripheralStationId="PeripheralStation2" deviceName="PinPad" />
  <Device peripheralStationId="PeripheralStation2" deviceName="Micr" />
  </Devices>
  </PosStation>
- <PosStation name="DeliStation1">
- <Devices>
  <Device peripheralStationId="PeripheralStation3" deviceName="Scanner" />
  <Device peripheralStationId="PeripheralStation3" deviceName="Printer" />
  </Devices>
  </PosStation>
- <PosStation name="BackOffice1">
- <Devices>
  <Device peripheralStationId="PeripheralStation4" deviceName="Printer" />
  </Devices>
  </PosStation>
14  </PosStations>
- <PeripheralStations>
  <PeripheralStation name="PeripheralStation1" host="192.168.1.112" />
  <PeripheralStation name="PeripheralStation2" host="192.168.1.213" />
  <PeripheralStation name="PeripheralStation3" host="" />
- <!--
  Auto Detect
  -->
  <PeripheralStation name="PeripheralStation4" host="localhost" />
  </PeripheralStations>
  </PeripheralStationManager>
```

SYSTEM AND METHOD OF CONNECTING A COMPUTER TO A PERIPHERAL OF ANOTHER COMPUTER

CROSS-REFERENCE TO RELATED APPLICATION

The present application is a continuation application and claims the benefit of the filing date of application Ser. No. 13/628,948, filed Sep. 27, 2012, entitled, "System and Method of Connecting a Computer to a Peripheral of Another Computer".

BACKGROUND

Computer systems typically include one or more processors, memory, program and data storage, a display, and other circuitry for connecting to peripherals, such as a keyboard or other input device.

In some environments, such as retail point-of-sale (POS) environments, equipping each POS terminal with a set of peripherals is expensive and causes each POS terminal to have a large footprint in a store.

Therefore, it would be desirable to provide a system and method of connecting computers to a common set of remote peripherals.

SUMMARY

A system and method of connecting a computer to a peripheral of another computer is provided.

An example system includes a processor connected to a network and to first and second computers through the network. The first computer executes application software and the second computer includes one or more peripherals organized with the second computer as a peripheral station. The processor executes web service software which establishes a discovery service for receiving a peripheral connection request from the application software, and peripheral management software which receives information from the second computer through the web service software about the peripherals and the second computer, logically associates the peripherals and the second computer with a peripheral station, receives the peripheral connection request from the application software, maps the first computer to a requested peripheral of the peripheral station, and sends information to the application software through the web service software to facilitate connection by the application software to the requested peripheral of the peripheral station through the second computer.

An example method of connecting a computer to a peripheral of another computer includes determining that the peripheral is available for use, receiving a request from the computer through a web service to connect to the peripheral, mapping the peripheral to the computer, and sending information to the computer through the web service to facilitate connection by the computer to the peripheral through the other computer.

An example method of connecting application software of a first computer to one or more peripherals of a second computer at a peripheral station includes receiving information from the second computer through web service software identifying the second computer, the peripherals including peripheral type information, and the statuses of the peripherals including whether the peripherals are available for use or not available for use, logically associating the peripherals and the second computer with the peripheral station including the peripheral type information, receiving a request to connect to a type of peripheral from the application software, including information about the first computer, through the web service software, determining that the peripheral station has the type of peripheral and that the type of peripheral is available for use, mapping one peripheral of the type of peripheral to the first computer, and sending information to the application software through the web service software to facilitate connection by the application software to the one peripheral through the second computer.

Peripheral control software of the peripheral station provides a list of peripherals. information about the peripherals may be in a web page associated with a web service of the peripheral station. The peripheral management software may receive a uniform resource locator to the web page from the peripheral station. To facilitate a connection between the application software of the first computer and the peripheral of the peripheral station, the peripheral management software may provide the uniform resource locator of a web service for the peripheral to the application software The peripheral management software manages release of peripherals from the application software, for example, when the application software no longer requires use of the peripheral, when the first computer goes offline, or when the second computer and/or a connected peripheral goes offline. The peripheral management software also manages connection to other peripherals, for example, at other peripheral stations following release.

BRIEF DESCRIPTION OF THE DRAWINGS

FIG. 4 illustrates example configuration data mapping computers to peripherals.

DETAILED DESCRIPTION

Figure 1:
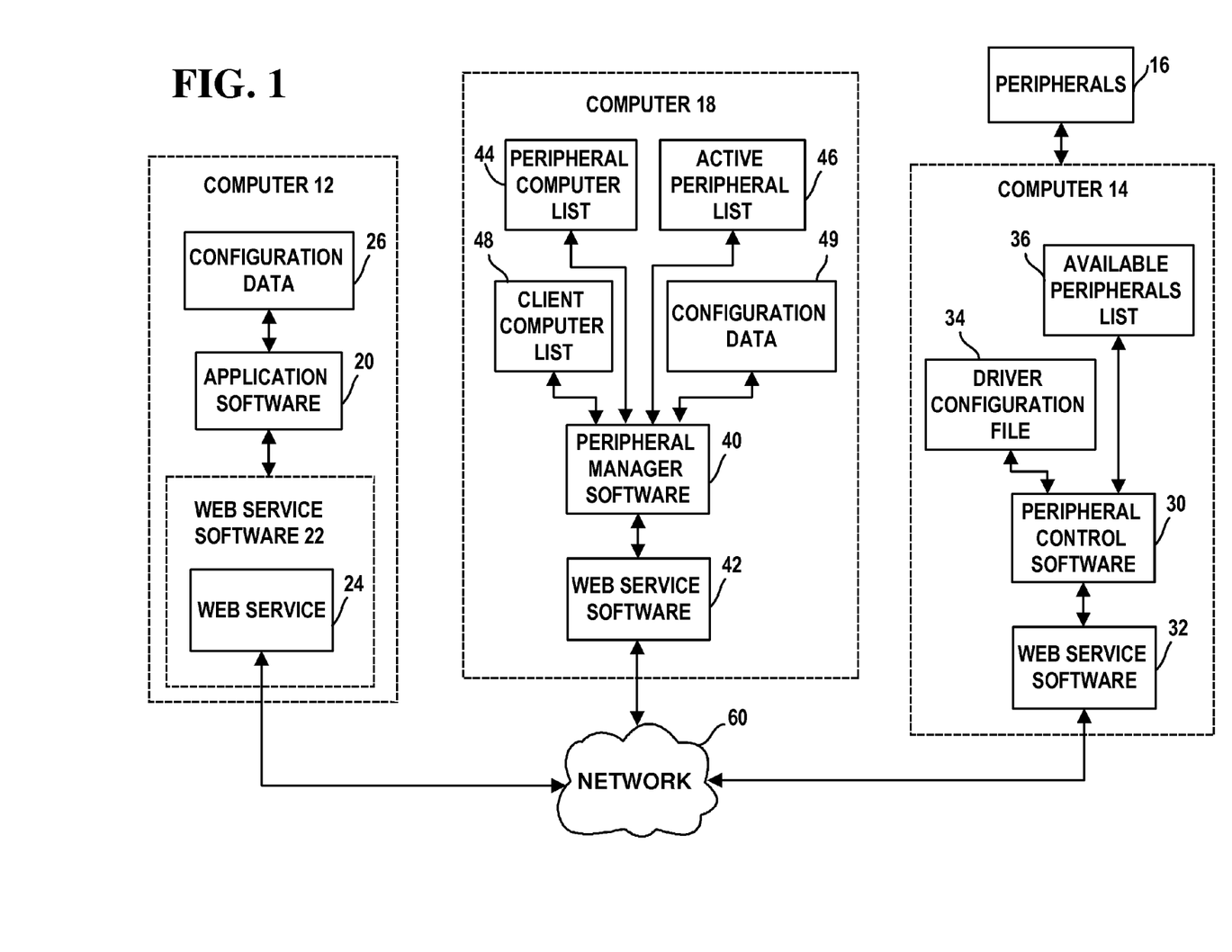
FIG. 1 is a block diagram of an example system.

Referring now to FIG. 1, an example system includes computer 18 connected by network 60 to computer 14 and one or more peripherals 16, and to computer 12.

Computer 12 includes one or more processors, memory, and program and data storage. Computer 12 may execute an operating system, such as a Microsoft, Google, Apple, or Linux operating system. Computer 12 further includes network circuitry for connecting to network 60, via wire and/or wireless, and other circuitry for connecting to one or more peripherals, such as an input device and display (e.g., a touch overlay to the display). For example, computer 12 may include Universal Serial Bus (USB) circuitry and/or Bluetooth standard circuitry.

Computer 12 may include, but not be limited to, a personal computer, a portable computer, or a mobile computing/communication device, such as a smart phone, tablet, or personal digital assistant. Since computer 12 shares peripherals 16 coupled to computer 14, computer 12 may be used in environments requiring a computing solution with a smaller footprint than a computer with peripherals 16. Sharing of peripherals 16 may also provide cost advantages. For example, one or more computers 12 may be used in a retail point-of-sale (POS) environment.

Computer 12 executes other computer software that may be stored in a computer readable medium. For example, computer 12 executes application software 20 and World Wide Web (web) service software 22.

Application software 20 performs one or more functions which may require use of peripherals 16. For example, application software 20 may include POS transaction software that requires use of a printer to print a receipt. Application software 20 can be written in any software language.

Application software 20 connects to peripherals 16 through web service software 22. Application 20 may use configuration data 26 to identify peripherals that are locally connected to computer 12, for example, directly connected to a USB port of computer 12, from peripherals 16, which are remotely accessible through a network connection to computer 14. Configuration data 26 may also include settings governing when the local and remote peripherals should be used.

If configuration data 26 includes a remote peripheral 16, application software 20 sends a request to peripheral station manager 40 at computer 18. Peripheral manager software 40 sends a message to application software 20 through web service software 24 and 42 with information identifying computer 14 and peripheral 16.

Web service software 22 facilitates communication of data between application software 20 and other applications on other computers, including computer 14. For example, web service software 22 may include one or more standard web services 24. In addition, web service software 22 may include web service support software, such as application server software for hosting the web service 24, and Hypertext Transfer Protocol (HTTP) or web server software for providing HTTP protocol message support.

Web service 24 may include an Extensible Markup Language (XML) document in a Web Services Description Language (WSDL) describing operations, messages, bindings, and a location or address at which web service 24 may be called. Web service 24 may communicate using open protocols, such as Simple Object Access Protocol (SOAP) over HTTP.

Web service 24 is tailored to meet the interoperability requirements of application software 20. For example, when application software 20 calls web service application 24 and requests use one or more of peripherals 16, web service 24 communicates with computer 14 using XML messages to establish a connection between application software 20 and peripherals 16. The web service of computer 14 supports WSDL, which has known methods for controlling peripherals 16.

Computer 14 includes one or more processors, memory, and program and data storage. Computer 14 may execute an operating system, such as a Microsoft, Google, Linux, or Apple operating system. Computer 14 may execute other computer software that may be stored in a computer readable medium, such as a memory. Computer 14 may include network circuitry for connecting to network 60, via wire and/or wireless, and circuitry for connecting to peripherals 16, such as network, USB and/or Bluetooth standard circuitry.

Figure 2:
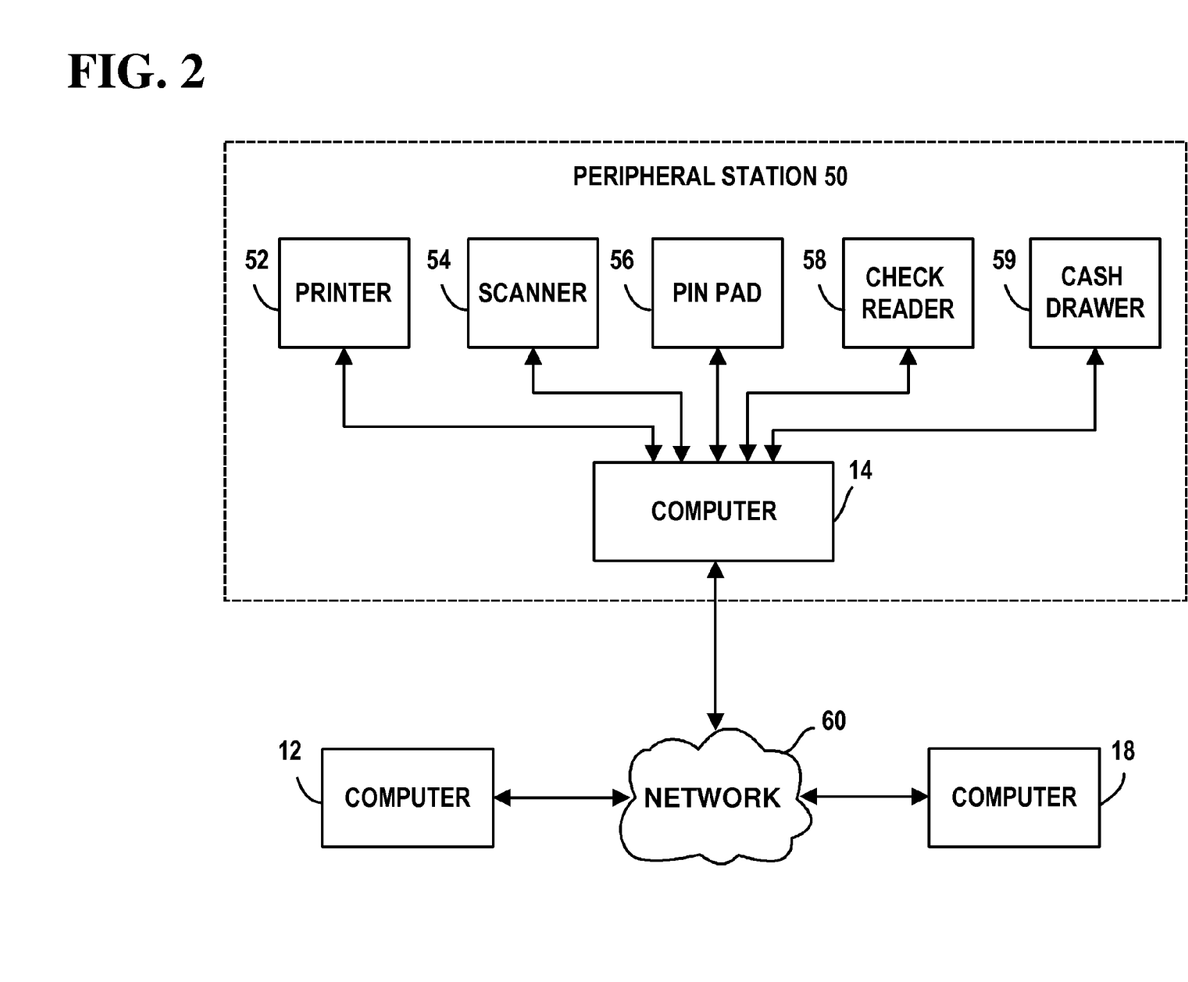
FIG. 2 is a diagrammatic view of the example system.

With reference to FIG. 2, computer 14 and peripherals 16 may form a peripheral station 50. One or more peripheral stations 50 are envisioned, depending upon environment. For example, in a retail POS environment, any of a plurality of POS computers 12 may connect to any of a plurality of peripheral stations 50. Further, any of a plurality of mobile computers 12 may connect to any of plurality of peripheral stations 50 via wireless networking.

Example peripheral station 50 may include computer 14 and peripherals including, but not limited to, printer 52 for printing receipts, scanner 54 for reading barcode labels on products, personal identification number (PIN) keypad or "PIN pad" for capturing PIN numbers during a card transaction, check reader 58 for reading customer checks, and cash (e.g., coin and currency) drawer 59.

Computer 14 may include an appliance primarily dedicated to coupling other computers, such as computer 12, to peripherals 16. As such, computer 14 may include a network interface with connections to peripherals 16.

Alternatively, computer 14 may have one or more other purposes besides establishing peripheral connections. As such, computer 14 may further include software and components necessary for its purpose.

For example, computer 14 may include graphics circuitry for connecting to a display and may couple to other peripherals, such an input device (e.g., a touch overlay to the display).

Computer 14 executes other computer software that may be stored in a computer readable medium. For example, computer 14 executes peripheral control software 30.

Peripheral control software 30 configures peripherals 16 and stores configuration settings in driver configuration data 34. Driver software or 'drivers' for peripherals 16 may be bundled with the operating system. For this purpose, peripheral control software 30 may use a driver configuration utility within the operating system to configure peripherals 16.

Alternatively, some drivers may be provided separately and installed in accordance with instructions from manufacturers of peripherals 16. For example, in a retail store environment, the drivers for peripherals 16 may include Object Linking and Embedding for Retail POS (OPOS) drivers. For this purpose, peripheral control software 30 may use an OPOS driver configuration utility to configure peripherals 16 based upon settings in configuration data 34.

Configuration data 34 contains a list of peripherals 16 listed as locally connected to computer 14 and may include settings governing when peripherals 16 should be used. If configuration data 26 indicates that a peripheral is an OPOS peripheral, configuration data 34 may indicate any OPOS software, such as OPOS service objects, that are needed to assist in controlling the OPOS peripheral.

Peripheral control software 30 maintains a list 36 of peripherals 16 that are configured. Peripheral control software 30 includes only peripherals 16 that are online and working, i.e., not peripherals that are powered off or malfunctioning. Peripheral control software 30 additionally makes list 36 available to other applications and computers by periodically broadcasting messages identifying availability of peripherals 16. For example, peripheral control software 30 may send messages with a peripheral station name. Peripheral control software 30 may further include web server software for hosting a web page containing list 36.

In an example embodiment, peripheral control software 30 may be written in C-Sharp, Visual Basic Script, Javascript, or other suitable language, and may be combined with hypertext markup language (HTML) or other suitable web development language in a web page.

Associated with peripheral control software 30 is web service software 32, which, like web service software 22, includes a standard web service and associated web service support software. Web service software 32 facilitates communication of data between peripheral control software 30 and other applications.

Computer 18 includes one or more processors, memory, and program and data storage. Computer 18 may execute an operating system, such as a Microsoft, Google, Linux, or Apple operating system. Computer 18 may execute other computer software that may be stored in a computer readable medium, such as a memory. Computer 18 may include network circuitry for connecting to network 60, via wire and/or wireless, and circuitry for connecting to peripherals 16, such as network, USB and/or Bluetooth standard circuitry.

Figure 3:
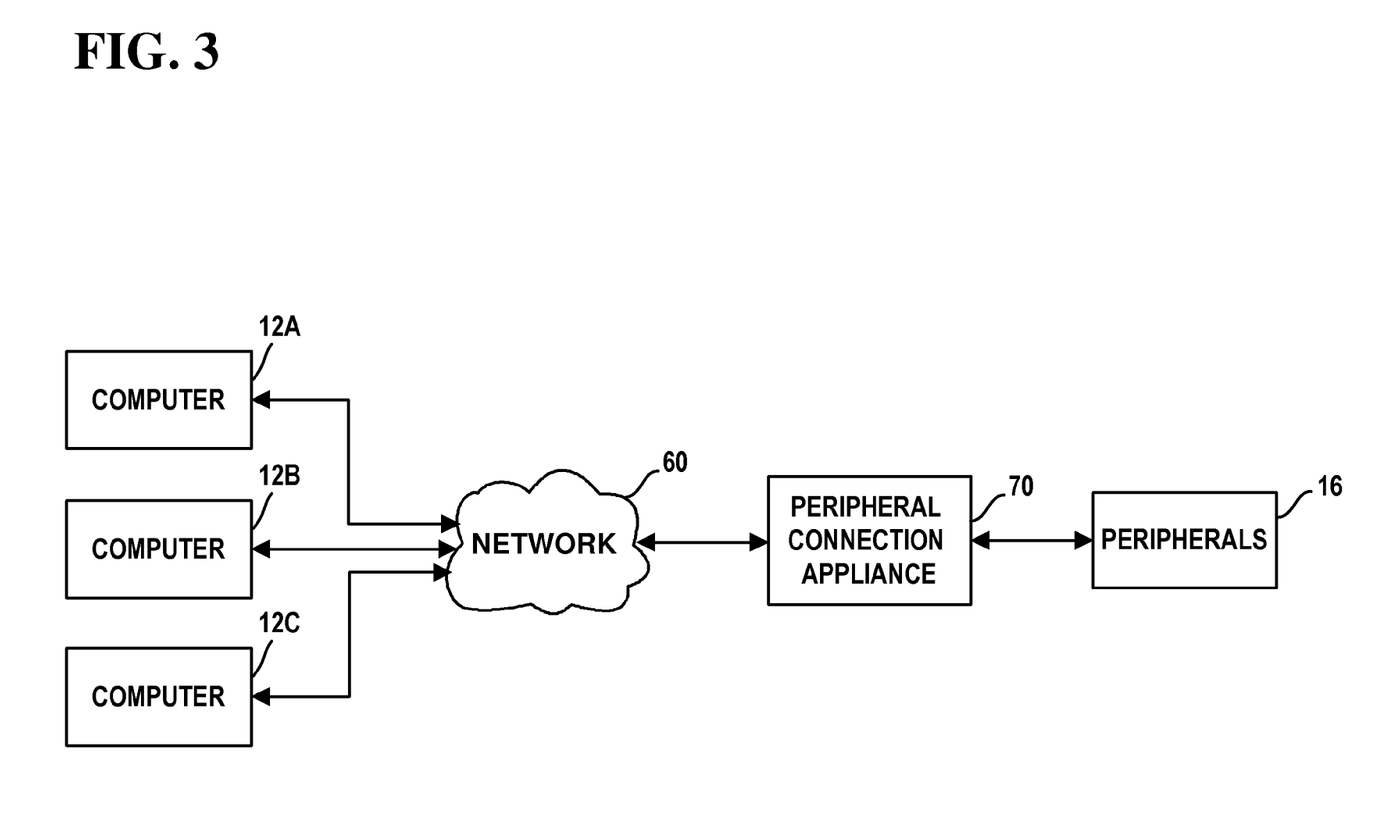
FIG. 3 is a block diagram of another example system.

Computer 18 may primarily manage peripheral stations 50 and coupling of other computers, such as computer 12, to peripheral stations 50. As such, computer 18 may include a server computer with a network interface with connections to network 60. Further, the functions of computer 14 and computer 18 may be combined into a single computer system or peripheral connection appliance 70 connected to network 60 that is primarily dedicated to coupling other computers 12, such as computer 12A through 12C, to peripherals 16 (FIG. 3).

Alternatively, computer 18 may have one or more other purposes besides establishing peripheral connections. As such, computer 18 may further include software and components necessary for its purpose.

For example, computer 18 may include graphics circuitry for connecting to a display and may couple to other peripherals, such an input device (e.g., a touch overlay to the display).

Computer 18 executes other computer software that may be stored in a computer readable medium. For example, computer 18 executes peripheral manager software 40 and web service software 42.

Web service software 42, like web service software 22, includes a standard web service and associated web service support software. Web service software 42 facilitates communication of data between peripheral manager software 40 and other applications. Web service software 42 acts as a discovery service for helping computers like computer 12 find and connect to peripherals 16.

Peripheral manager software 40 receives the broadcast messages from peripheral control software 30, obtains the name of the peripheral station 50 from the message and determines the internet protocol (IP) address of computer 14 from the message. Peripheral manager software 40 lists the peripheral stations 50 in configuration data 49 (FIG. 4).

Peripheral manager software 40 further obtains list 36 of configured peripherals 16 from peripheral control software 30, maintains list 36 as list 46 of active peripherals 16, regularly receives updated lists 36, and updates list 46 as peripherals 16 become available or unavailable. Peripheral manager software 40 may manage connections to peripherals 16 of a plurality of computers 14.

Peripheral manager software 40 maintains a list 44 of computers 14 that have peripherals 16 to share, establishes logical groups, and assigns peripherals 16 to the logical groups or device clusters. For example, peripheral manager software 40 may group all peripherals 16 associated with a first computer 14 into a first peripheral station or "PeripheralStation1".

Peripheral manager software 40 further maintains a list 48 of computers 12 requesting connections to peripherals 16 and manages connection and release of peripherals 16 in list 48, or groups of peripherals 16, from computers in list 44. Peripheral manager software 40 may combine, in any combination, lists 44, 46, and 48 into a mapping of computers 12 to peripherals 16 as configuration data 49 (FIG. 4).

In an example embodiment, peripheral control software 40 may be written in C-Sharp, Visual Basic Script, Javascript, or other suitable language, and may be combined with hypertext markup language (HTML) or other suitable web development language in a web page.

Network 60 may include one which uses the transmission control protocol/internet protocol (TCP/IP). Network 60 may include a combination of local area and wide area networks. Network 60 may include any combination of wireless or wired networks. Network 60 may include a combination of private and public networks, including a global communication network, also known as the Internet.

With reference to FIG. 4, example configuration data 49 is illustrated as XML data, which identifies computers 12 at different locations throughout a retail store. Example locations include an "Electronics" department, a "Jewelry" department, a Deli location or "DeliStation1", and a back office or "BackOffice1".

The XML data also maps computers 12 to computers 14 and their peripherals 16. A first computer 14 and its peripherals 16 are associated with a first peripheral station or "PeripheralStation1", a second computer 14 and its peripherals 16 are associated with a second peripheral station or "PeripheralStation2", a third computer 14 and its peripherals 16 are associated with a third peripheral station or "PeripheralStation3", and a fourth computer 14 and its peripherals 16 are associated with a fourth peripheral station or "PeripheralStation4."

Thus, in the example configuration, the POS computer 12 in the Electronics department is connected to PeripheralStation1 and its peripherals 16, including a cash drawer, a scanner, a printer, a PIN Pad, and a check or magnetic ink character reader (MICR). The POS computer 12 in the Jewelry department is connected to PeripheralStation2 and its peripherals 16, including a cash drawer, a scanner, a printer, a PinPad, and a MICR. The POS computer 12 in the Deli is connected to PeripheralStation3 and its peripherals 16, including a scanner and a printer. Finally, the back office computer 12 is connected to PeripheralStation4 and its peripherals 16, including a printer.

Peripheral manager software 40 automatically updates configuration data 49 as peripherals 16 become active or go inactive and as computers 12 request connections to peripherals 16.

Figure 5:
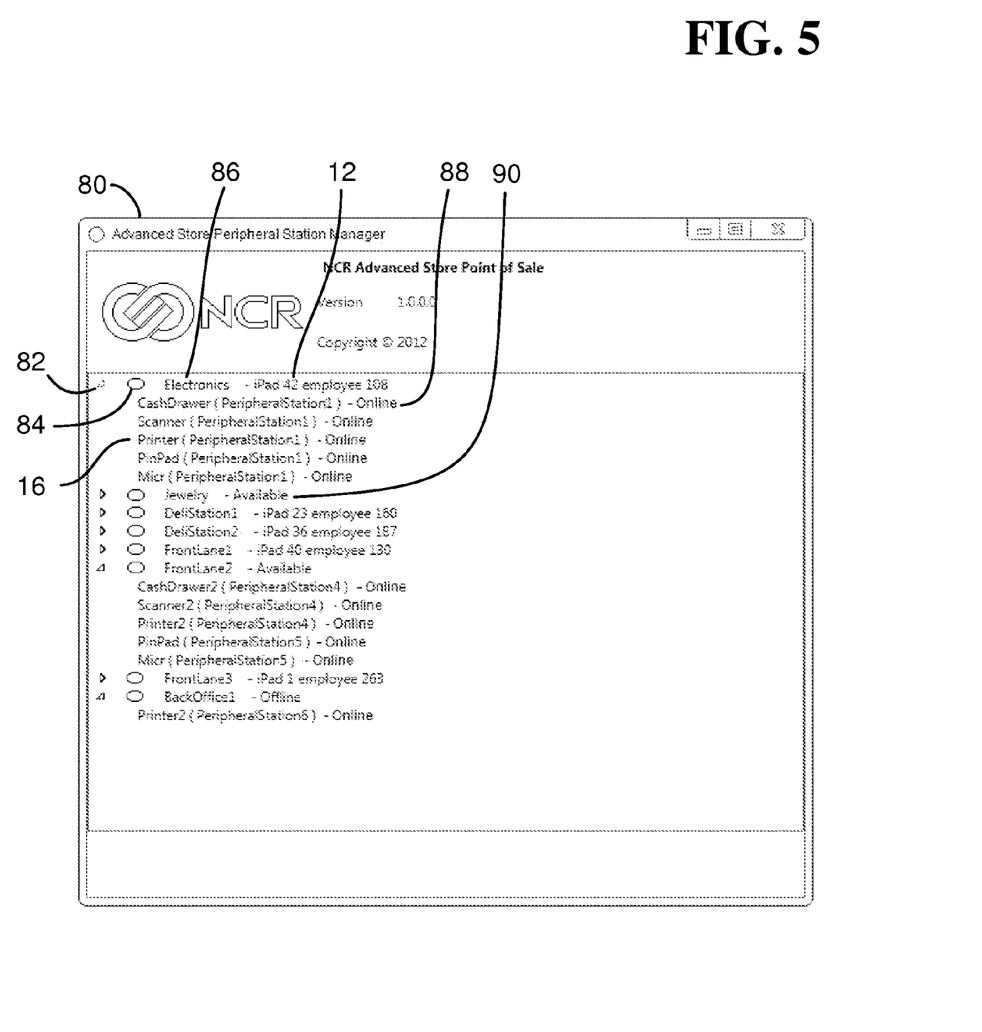
FIG. 5 illustrates an example screen for monitoring computers and peripheral connections to the computers.

With reference to FIG. 5, an example screen 80 from peripheral manager software 40 is illustrated. An operator may monitor connections of computers 12 to peripheral stations 50 and the status of peripherals 16.

Screen 80 provides a list view of computers 12 at different locations or stations 86 throughout a retail store. For example, at the "Electronics" station, an employee tracked by number 108 is using an Apple iPad brand computer 12 tracked by number 42.

Screen 80 may include visual aids that quickly communicate the network connection status of computers 12 at stations 86, i.e., either 'online' or 'offline'. For example, screen 80 may include color markers 84 adjacent each station. Green may indicate that the corresponding computer 12 is online, while yellow may indicate that the corresponding computer 12 is offline.

Screen 80 may include navigation features, such as expansion triangles 82 associated with each station 86, for expanding the list view to show peripherals 16 connected to computers 12 at stations 86. For example, computer 12 at the Electronics station is connected to PeripheralStation1 and its peripherals 16, including a cash drawer, a scanner, a printer, a Pin Pad, and a MICR.

Screen 80 further includes status information 90 next to each peripheral. For example, each of peripherals 16 includes a status indicator that indicates that peripherals 16 are 'online', i.e., powered on, initialized by peripheral control software 30, and available for use.

Figure 6A:
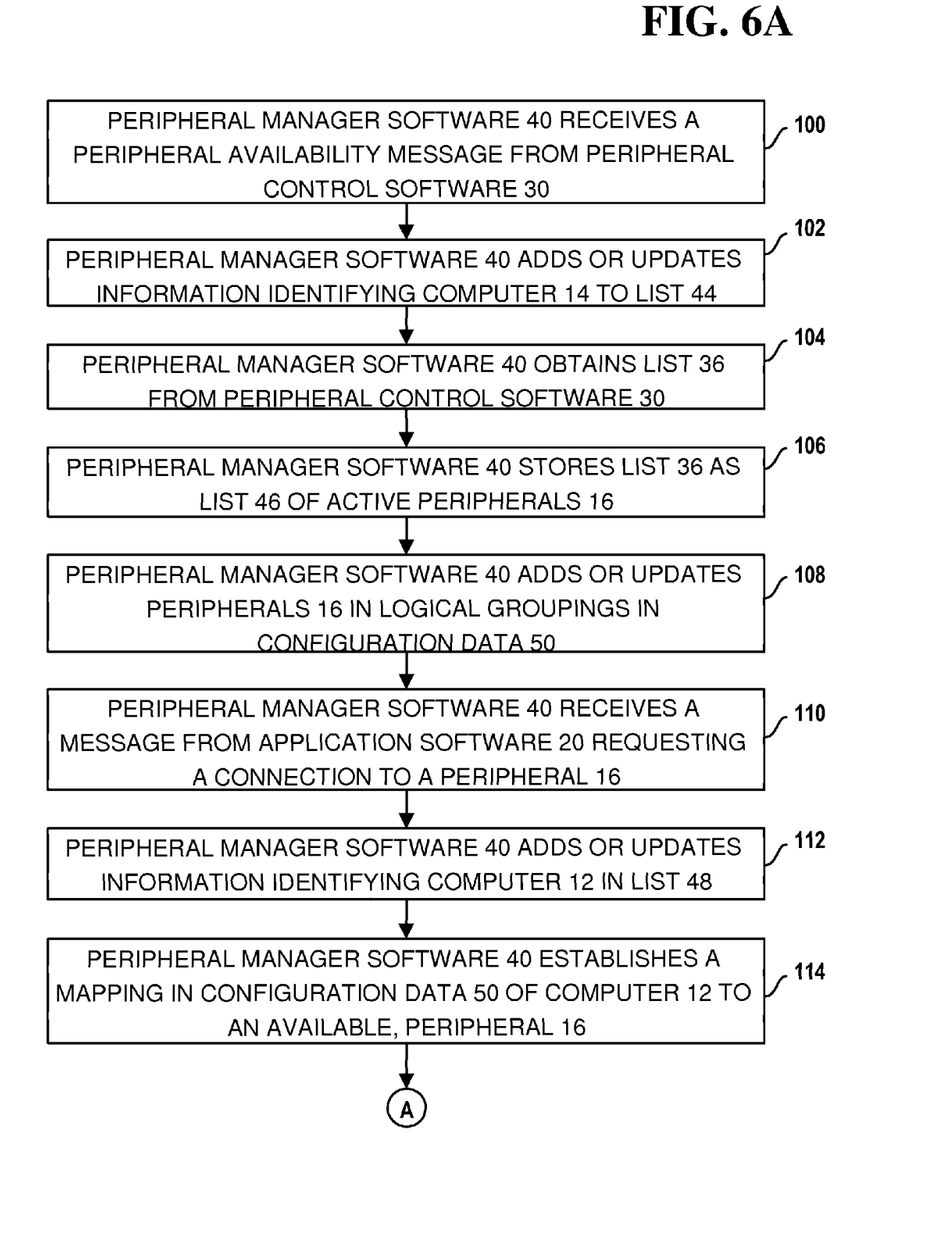
FIGS. 6A and 6B form a flow diagram illustrating a method of connecting a computer to a peripheral.
Figure 6B:
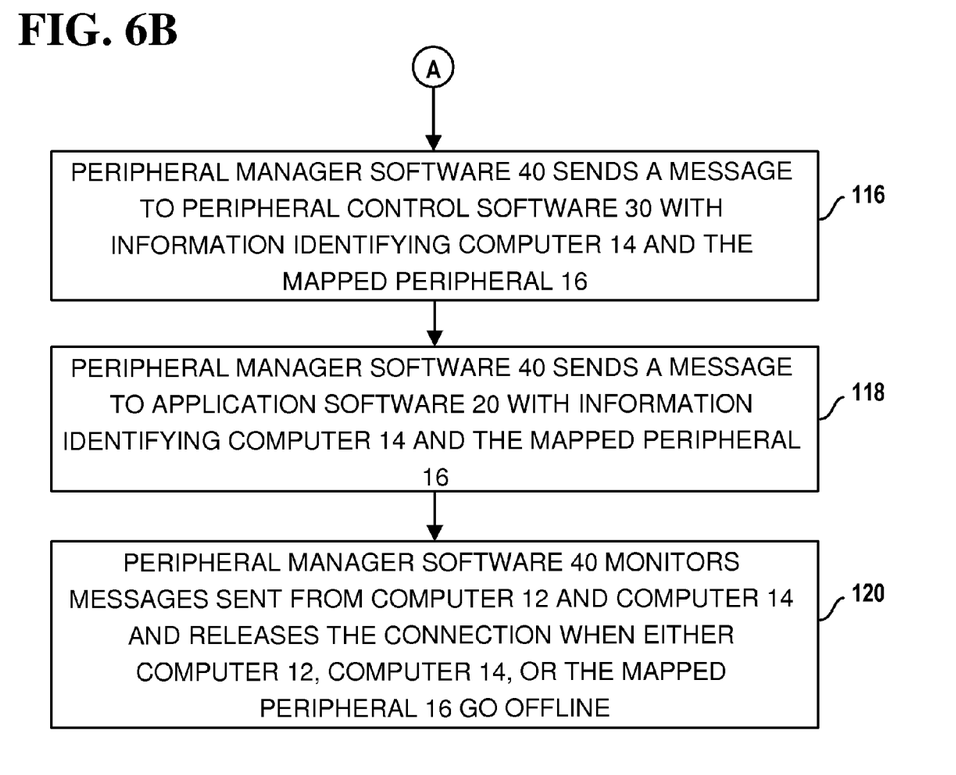

Referring now to FIGS. 6A and 6B, the operation of peripheral manager software 40 is described in detail.

In step 80, peripheral manager software 40 receives a message from peripheral control software 30 through web service software 32 and 42 with peripheral information. Peripheral manager software 40 may periodically receive such messages from peripheral control software 30 as peripherals 16 become available or unavailable. For example, peripheral control software 30 may trigger an event to notify peripheral manager software 40 if the status of any of peripherals 16 changes.

In an example embodiment, peripheral control software 30 identifies peripherals 16 that are being used or "claimed" by application 20, peripherals 16 that are available for use ready to be claimed, or peripherals 16 that are unavailable and excluded from list 36. Peripheral manager software 40 uses this information to display the status of each peripheral as online or offline, and to show the overall station status as yellow or green (FIG. 4).

Peripheral manager software 40 obtains list 36, and/or an updated list 36, of configured peripherals 16 from peripheral control software 30 through web service software 32 and 42. For example, peripheral manager software 40 may receive a URL to a web service of web service software 32 for each peripheral 16 at peripheral station 50.

In step 82, peripheral manager software 40 adds information identifying computer 14 to peripheral computer list 44, if computer 14 is not already in list 44. For example, peripheral manager software 40 obtains the name of the personal station 50 containing computer 14 from the message and the IP address of computer 14.

In step 84, peripheral manager software 40 stores list 36 as list 46 of active peripherals, and/or updates list 46 to reflect changes from a previously received list 36.

In step 86, peripheral manager software 40 adds peripherals 16 to logical groupings of peripherals 16 in configuration data 49, or updates configuration data 49 to reflect changes from a previous list 46. For example, peripheral manager software 40 may group all peripherals 16 associated with a first computer 14 into a first peripheral station 50 or "PeripheralStation1".

In step 88, peripheral manager software 40 receives a message from application software 20 of computer 12 through web service software 24 and 42 requesting a connection to a particular a type of peripheral 16, for example, a receipt printer.

In step 90, peripheral manager software 40 adds information identifying computer 12 to client computer list 48, and/or updates list 48 to reflect changes in received identifying information.

In step 92, peripheral manager software 40 establishes a mapping in configuration data 49 of computer 12 to an active unclaimed peripheral 16 of the type requested in a logical grouping in configuration data 49. For example, peripheral manager software 40 may map computer 12 to a receipt printer associated with PeripheralStation1.

In step 94, peripheral manager software 40 sends a message to application software 20 through web service software 24 and 42 with information identifying computer 14 and the mapped peripheral 16. For example, peripheral station manager 40 sends application 20 a URL for the web services used to control each requested peripheral 16 in station 50. Peripheral station manager 40 steps aside and allows application 20 to communicate with peripherals 16 through web service software 32. Application software 20 uses the information to communicate with peripherals 16 through web service software 32.

In step 96, peripheral manager software 40 receives and monitors messages sent from computer 12 and computer 14 and releases the connection when application software 20 no longer claims peripheral 16, or when computer 12, computer 14, or any mapped peripheral 16 go offline.

If application software 20 no longer claims peripheral 16, peripheral manager software 40 removes the corresponding mapping in configuration data 49. Peripheral manager software 40 may send a message to peripheral control software 30 releasing the connection.

If computer 12 goes offline, peripheral manager software 40 may try to reestablish communication with computer 12. If peripheral manager software 40 cannot reestablish communication after a predetermined time period, peripheral manager software 40 removes computer 12 from client computer list 48 and unmaps or removes the corresponding mapping in configuration data 49. Peripheral manager software 40 may send a message to peripheral control software 30 releasing the connection.

If computer 14 goes offline, peripheral manager software 40 may try to reestablish communication with computer 14. After a predetermined time period, peripheral manager software 40 releases computer 14 by removing computer 14 from peripheral computer list 44, removing peripherals 16 from active peripheral list 46, and unmapping or removing the corresponding mappings of peripherals 16 to computers 12 in configuration data 49. Peripheral manager software 40 may send a message to computer 12 indicating that the connection to peripheral 16 is no longer active.

If peripheral 16 goes offline, peripheral manager software 40 removes the peripheral 16 from active peripheral list 46, and unmaps or removes any corresponding mapping of peripheral 16 to computer 12 in configuration data 49. Peripheral manager software 40 may map another peripheral 16 of the same type, such as another peripheral from another peripheral station, to computer 12 in configuration data 49. Peripheral manager software 40 may send a message to computer 12 when the connection to peripheral station 50 is no longer active.

Peripheral control software 30 may mark the mapped peripheral as unavailable.

Advantageously, the system and method of connecting computer 12 to peripherals 16 may provide cost and space savings, particularly in environments such as retail POS environments.

Although the present invention has been described with particular reference to certain preferred embodiments thereof, variations and modifications of the present invention can be effected within the spirit and scope of the following claims.

What is claimed is:

1. A method of connecting a computer to a peripheral of a peripheral station comprising:
   determining by a peripheral station computer that the peripheral is available for use;
   sending by the peripheral station computer information identifying the peripheral to a peripheral manager and broadcasting by the peripheral manager the computer information to the computer; and
   connecting the computer to the peripheral through web service software by the peripheral station computer.

2. The method of claim 1, wherein the message comprises a uniform resource locator for connecting to the peripheral through the web service software by the peripheral station computer.

3. The method of claim 1, wherein the message comprises a name of the peripheral station computer.

4. The method of claim 1, wherein the message comprises a network address of the peripheral station computer.

5. The method of claim 1, further comprising configuring the peripheral for use by the peripheral station computer.

6. The method of claim 1, further comprising:
determining by the peripheral station computer that the peripheral is no longer available; and
notifying the peripheral manager that the peripheral is no longer available by the peripheral station computer.

7. The method of claim 1, further comprising maintaining a list of available peripherals including the one peripheral by the peripheral station computer.

8. The method of claim 7, further comprising hosting a web page containing a list of available peripherals including the one peripheral by the peripheral station computer.

9. A system comprising:
a computer; and
a plurality of peripherals coupled to the computer, wherein the computer is configured to determine which peripherals are available for use and which peripherals are unavailable for use;
send information identifying the peripherals available for use and broadcast the information to the network computer; and
connect the network computer to the peripheral through web service software.

10. The system of claim 8, wherein the computer comprises an appliance.

11. The system of claim 8, wherein the computer comprises a point of sale terminal.

12. A method of connecting a network computer to a peripheral comprising:
receiving a list of peripheral stations, wherein each peripheral station includes a peripheral station computer and at least one peripheral;
broadcasting the peripherals of the peripheral stations over a network;
receiving through a web service a request to connect to a number of the peripherals from a network computer;
mapping the number of peripherals to the network computer; and
sending information to the network computer through the web service to facilitate connection by the network computer to the number of peripherals.

13. The method of claim 12, wherein the information comprises uniform resource locators to connect through web services of peripheral station computers associated with the number of peripherals.

14. The method of claim 12, further comprising assigning the peripherals of the peripheral stations to groups.

15. The method of claim 14, wherein the request from the network computer is based upon the number of peripherals being in a predetermined group.

16. The method of claim 14, wherein the peripherals of the peripheral stations are grouped by peripheral station.

17. The method of claim 14, wherein the peripherals of the peripheral stations are grouped by location.

18. The method of claim 12, further comprising:
adding the network computer to a list of active network computers; and
monitoring an operational status of the network computer.

19. The method of claim 18, further comprising attempting to reestablish communication with the network computer when the operational status indicates that the network computer is offline.

20. The method of claim 18, further comprising removing the network computer from the list of active network computers when the operational status indicates that the network computer is offline.

21. The method of claim 12, further comprising:
adding peripheral station computers associated with the number of peripherals to a list of active peripheral station computers; and
monitoring an operational status of the peripheral station computers associated with the number of peripherals.

22. The method of claim 21, further comprising attempting to reestablish communication with one of the peripheral station computers associated with the number of peripherals when the operational status indicates that the one peripheral station computer is offline.

23. The method of claim 21, further comprising removing one of the peripheral station computers associated with the number of peripherals from the list of active peripheral station computers when the operational status indicates that the one peripheral station computer is offline.

24. The method of claim 12, further comprising displaying a screen indicating a connection status between the network computer and the number of peripherals.

25. The method of claim 12, further comprising displaying a screen indicating availability of the peripheral stations.

26. The method of claim 12, further comprising displaying a screen indicating availability of the peripherals of the peripheral stations.

27. The method of claim 12, wherein the network computer comprises one of a portable computer, a mobile computing device, and a personal computer.

* * * * *